(12) United States Patent
Khambete (10) Patent No.: US 9,118,462 B2
(45) Date of Patent: Aug. 25, 2015

(54) CONTENT SHARING SYSTEMS AND METHODS

(75) Inventor: Prasad Khambete, Cupertino, CA (US)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 12/784,290

(22) Filed: May 20, 2010

(65) Prior Publication Data

US 2010/0299522 A1 Nov. 25, 2010

Related U.S. Application Data

(60) Provisional application No. 61/180,069, filed on May 20, 2009.

(51) Int. Cl.
| | |
|---|---|
| H04L 9/32 | (2006.01) |
| H04L 9/08 | (2006.01) |
| H04L 29/06 | (2006.01) |
| H04N 21/254 | (2011.01) |
| H04N 21/2747 | (2011.01) |
| H04N 21/442 | (2011.01) |
| H04N 21/4627 | (2011.01) |
| H04N 21/4788 | (2011.01) |
| H04N 21/8355 | (2011.01) |

(52) U.S. Cl.
CPC ............ *H04L 9/0822* (2013.01); *H04L 9/0825* (2013.01); *H04L 9/3268* (2013.01); *H04L 9/3273* (2013.01); *H04L 63/061* (2013.01); *H04L 63/12* (2013.01); *H04N 21/2541* (2013.01); *H04N 21/2747* (2013.01); *H04N 21/44204* (2013.01); *H04N 21/4627* (2013.01); *H04N 21/4788* (2013.01); *H04N 21/8355* (2013.01); *H04L 63/166* (2013.01); *H04L 2209/603* (2013.01)

(58) Field of Classification Search
USPC ............ 705/51, 54, 56, 57, 59; 713/156, 164, 713/165, 168; 726/27–31
See application file for complete search history.

(56) References Cited

U.S. PATENT DOCUMENTS

| | | |
|---|---|---|
| 5,399,874 A | 3/1995 | Gonsalves et al. |
| 5,668,897 A | 9/1997 | Stolfo |
| 5,724,521 A | 3/1998 | Dedrick |
| 5,785,353 A | 7/1998 | Diamond |

(Continued)

FOREIGN PATENT DOCUMENTS

| | | |
|---|---|---|
| EP | 1139198 A2 | 10/2001 |
| EP | 1477879 A2 | 11/2004 |

(Continued)

OTHER PUBLICATIONS

International Search Report and International Written Opinion mailed Dec. 29, 2010 for application No. PCT/2010/001500.

(Continued)

*Primary Examiner* — Brandon Hoffman
(74) *Attorney, Agent, or Firm* — Mintz Levin Cohn Ferris Glovsky and Popeo, P.C.

(57) ABSTRACT

Systems and methods are described for peer-to-peer sharing of electronic content. In one embodiment, if a license associated with a content item permits a sharing peer to share the content item with a receiving peer, the sharing peer rebinds a cryptographic key associated with the content item to the receiving peer and generates a sharing license for the content item. The sharing peer sends the sharing license and the content item to the receiving peer for consumption.

20 Claims, 7 Drawing Sheets

(56) References Cited

U.S. PATENT DOCUMENTS

| | | | |
|---|---|---|---|
| 5,974,548 A | 10/1999 | Adams | |
| 6,144,944 A | 11/2000 | Kurtzman et al. | |
| 6,233,684 B1 | 5/2001 | Stefik et al. | |
| 6,314,521 B1 | 11/2001 | Debry | |
| 6,351,815 B1 | 2/2002 | Adams | |
| 6,487,301 B1 | 11/2002 | Zhao | |
| 6,510,453 B1 | 1/2003 | Apfel et al. | |
| 6,567,530 B1 | 5/2003 | Keronen et al. | |
| 6,584,613 B1 | 6/2003 | Dunn et al. | |
| 6,785,815 B1 | 8/2004 | Serret-Avila et al. | |
| 6,862,583 B1 | 3/2005 | Mazzagatte et al. | |
| 6,957,062 B2 | 10/2005 | Castrogiovanni et al. | |
| 7,152,047 B1 | 12/2006 | Nagel | |
| 7,215,832 B1 | 5/2007 | Yamaguchi | |
| 7,236,610 B1 | 6/2007 | Luo et al. | |
| 7,383,441 B2 | 6/2008 | Vorbruggen et al. | |
| 7,877,460 B1 | 1/2011 | Brouwer et al. | |
| 8,055,536 B1 | 11/2011 | Olaiya et al. | |
| 8,776,216 B2 | 7/2014 | Boccon-Gibod et al. | |
| 2001/0051920 A1 | 12/2001 | Joao et al. | |
| 2002/0024714 A1 | 2/2002 | Sandstrom et al. | |
| 2002/0042884 A1 | 4/2002 | Wu et al. | |
| 2002/0083441 A1 | 6/2002 | Flickinger et al. | |
| 2002/0124182 A1 | 9/2002 | Bacso et al. | |
| 2002/0152169 A1 | 10/2002 | Dutta et al. | |
| 2002/0156677 A1 | 10/2002 | Peters et al. | |
| 2003/0028432 A1 | 2/2003 | Troyansky et al. | |
| 2003/0110497 A1 | 6/2003 | Yassin et al. | |
| 2003/0182246 A1 | 9/2003 | Johnson et al. | |
| 2003/0196110 A1* | 10/2003 | Lampson et al. | 713/200 |
| 2004/0022444 A1 | 2/2004 | Rhoads | |
| 2004/0039707 A9* | 2/2004 | Ricci | 705/59 |
| 2004/0117627 A1 | 6/2004 | Brewington | |
| 2004/0249709 A1 | 12/2004 | Donovan et al. | |
| 2004/0260574 A1 | 12/2004 | Gross | |
| 2005/0027871 A1 | 2/2005 | Bradley et al. | |
| 2005/0138357 A1* | 6/2005 | Swenson et al. | 713/155 |
| 2005/0144065 A1 | 6/2005 | Calabria et al. | |
| 2005/0198510 A1* | 9/2005 | Robert et al. | 713/175 |
| 2005/0203796 A1 | 9/2005 | Anand et al. | |
| 2005/0215238 A1 | 9/2005 | Macaluso | |
| 2007/0028106 A1 | 2/2007 | Lauter et al. | |
| 2007/0033397 A1 | 2/2007 | Phillips, II et al. | |
| 2007/0038931 A1 | 2/2007 | Allaire et al. | |
| 2007/0078775 A1* | 4/2007 | Huapaya et al. | 705/59 |
| 2007/0123275 A1 | 5/2007 | Faraz | |
| 2007/0136761 A1 | 6/2007 | Basmajian et al. | |
| 2007/0156838 A1 | 7/2007 | Kocho et al. | |
| 2007/0250383 A1 | 10/2007 | Tollinger et al. | |
| 2007/0288518 A1 | 12/2007 | Crigler et al. | |
| 2007/0296805 A1* | 12/2007 | Tedenvall et al. | 348/14.01 |
| 2008/0007567 A1 | 1/2008 | Clatworthy et al. | |
| 2008/0046758 A1* | 2/2008 | Cha et al. | 713/189 |
| 2008/0059631 A1 | 3/2008 | Bergstrom et al. | |
| 2008/0092239 A1 | 4/2008 | Sitrick et al. | |
| 2008/0103977 A1 | 5/2008 | Khosravy et al. | |
| 2008/0133311 A1 | 6/2008 | Madriz Ottolina | |
| 2008/0155589 A1 | 6/2008 | McKinnon et al. | |
| 2008/0187279 A1 | 8/2008 | Gilley et al. | |
| 2008/0262922 A1 | 10/2008 | Ahn et al. | |
| 2008/0301224 A1 | 12/2008 | Papageorgiou | |
| 2008/0307454 A1 | 12/2008 | Ahanger et al. | |
| 2009/0037949 A1 | 2/2009 | Birch | |
| 2009/0083147 A1 | 3/2009 | Paila et al. | |
| 2009/0198542 A1 | 8/2009 | D'Amore et al. | |
| 2009/0234923 A1* | 9/2009 | Hunter | 709/206 |
| 2010/0293049 A1 | 11/2010 | Maher et al. | |
| 2010/0293050 A1 | 11/2010 | Maher et al. | |
| 2010/0293058 A1 | 11/2010 | Maher et al. | |
| 2010/0299522 A1 | 11/2010 | Khambete | |

FOREIGN PATENT DOCUMENTS

| | | |
|---|---|---|
| JP | 2002-063474 | 2/2002 |
| JP | 2002-518946 | 6/2002 |
| JP | 2006-012149 | 1/2006 |
| JP | 2007286832 | 11/2007 |
| JP | 2008-077173 A | 4/2008 |
| KR | 2009-0021514 A | 3/2009 |

OTHER PUBLICATIONS

International Search Report and International Written Opinion mailed Jul. 2, 2009, for application No. PCT/2009/02703.
International Search Report and International Written Opinion mailed Dec. 14, 2010, for application No. PCT/2010/001509.
International Search Report and International Written Opinion mailed Dec. 14, 2010, for application No. PCT/2010/001510.
International Search Report and International Written Opinion mailed Dec. 14, 2010, for application No. PCT/2010/001511.
Office Action mailed Oct. 13, 2011, in U.S. Appl. No. 12/433,881.
Office Action mailed Feb. 17, 2012, in U.S. Appl. No. 12/433,881.
Office Action mailed Jan. 4, 2012, in U.S. Appl. No. 12/785,406.
Office Action mailed Mar. 19, 2012, in U.S. Appl. No. 12/785,409.
Office Action mailed Mar. 27, 2012, in U.S. Appl. No. 12/785,412.
Office Action mailed Jul. 12, 2012, in U.S. Appl. No. 12/785,406.
Final Office Action mailed Oct. 11, 2012, in U.S. Appl. No. 12/785,409.
Final Office Action mailed Oct. 31, 2012, in U.S. Appl. No. 12/785,412.
Extended Search Report mailed Nov. 27, 2012, in Application No. 09739235.1.
English translation of First Office Action mailed Dec. 10, 2012, in Chinese Patent Application No. 200980124975.2.
Office Action mailed Apr. 11, 2013, in U.S. Appl. No. 12/433,881.
Office Action mailed Apr. 23, 2013, in U.S. Appl. No. 12/785,406.
English translation of First Office Action mailed May 21, 2013, in Japanese Patent Application No. 2011-507464.
Non-Final Office Action mailed Jun. 21, 2013, in U.S. Appl. No. 12/785,412.
English translation of Second Office Action mailed Jun. 24, 2013 in Chinese Patent Application No. 200980124975.2.
Final Office Action mailed Jul. 18, 2013, in U.S. Appl. No. 12/433,881.
Non-Final Office Action mailed Jul. 23, 2013, in U.S. Appl. No. 12/785,406.
English translation of First Office Action mailed Jul. 30, 2013, in Japanese Patent Application No. 2012-511827.
First Office Action mailed Oct. 18, 2013, in Australian Patent Application No. 2009241759.

\* cited by examiner

CONTENT SHARING SYSTEMS AND METHODS

RELATED APPLICATIONS

This application claims priority from U.S. Provisional Patent Application Ser. No. 61/180,069, filed May 20, 2009, entitled "Content Sharing Systems and Methods," which is hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Uncontrolled peer-to-peer ("P2P") distribution of content is widespread today and results in a significant loss of revenue to content owners. Controlled peer-to-peer sharing using digital rights management ("DRM") technology would enable content owners to protect their rights while potentially providing users with the freedom to share and distribute content. Content owners would benefit from viral distribution of their content via increased sales.

Systems and methods are presented for facilitating the sharing of electronic content, including systems and methods for controlled peer-to-peer sharing of electronic content using DRM technology such as that described in U.S. patent application Ser. No. 11/583,693, filed Oct. 18, 2006 ("the '693 application"), and/or the service orchestration technology described in commonly assigned U.S. patent application Ser. No. 10/863,551 (Publication No. 2005/0027871) ("the '551 application") (the contents of both the '693 application and the '551 application are hereby incorporated by reference in their entirety), such that the original rights specified by a content creator/owner are preserved while enabling users to share and distribute content. It will be appreciated that these systems and methods are novel, as are many of the components, systems, and methods employed therein.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

In the description that follows, the following terms will generally have the following meanings, unless otherwise clear from the context:

Original License: A set of one or more DRM objects (e.g., such as those described in the '693 application) representing a license for a content item.

Sharing License: A set of one or more DRM objects representing a license for a content item that was, or will be, shared between peers in a peer-to-peer fashion.

Sharing Peer: A peer in a peer-to-peer interaction that is a source of shared content and/or a license.

Receiving Peer: A peer in a peer-to-peer interaction that is a recipient of shared content and/or a license. In some embodiments, at least some DRM clients are capable of acting as both Sharing Peers and Receiving Peers.

Semi-trusted Control: A Sharing License signed by a peer, rather than a trusted, independent DRM service.

Figure 1:
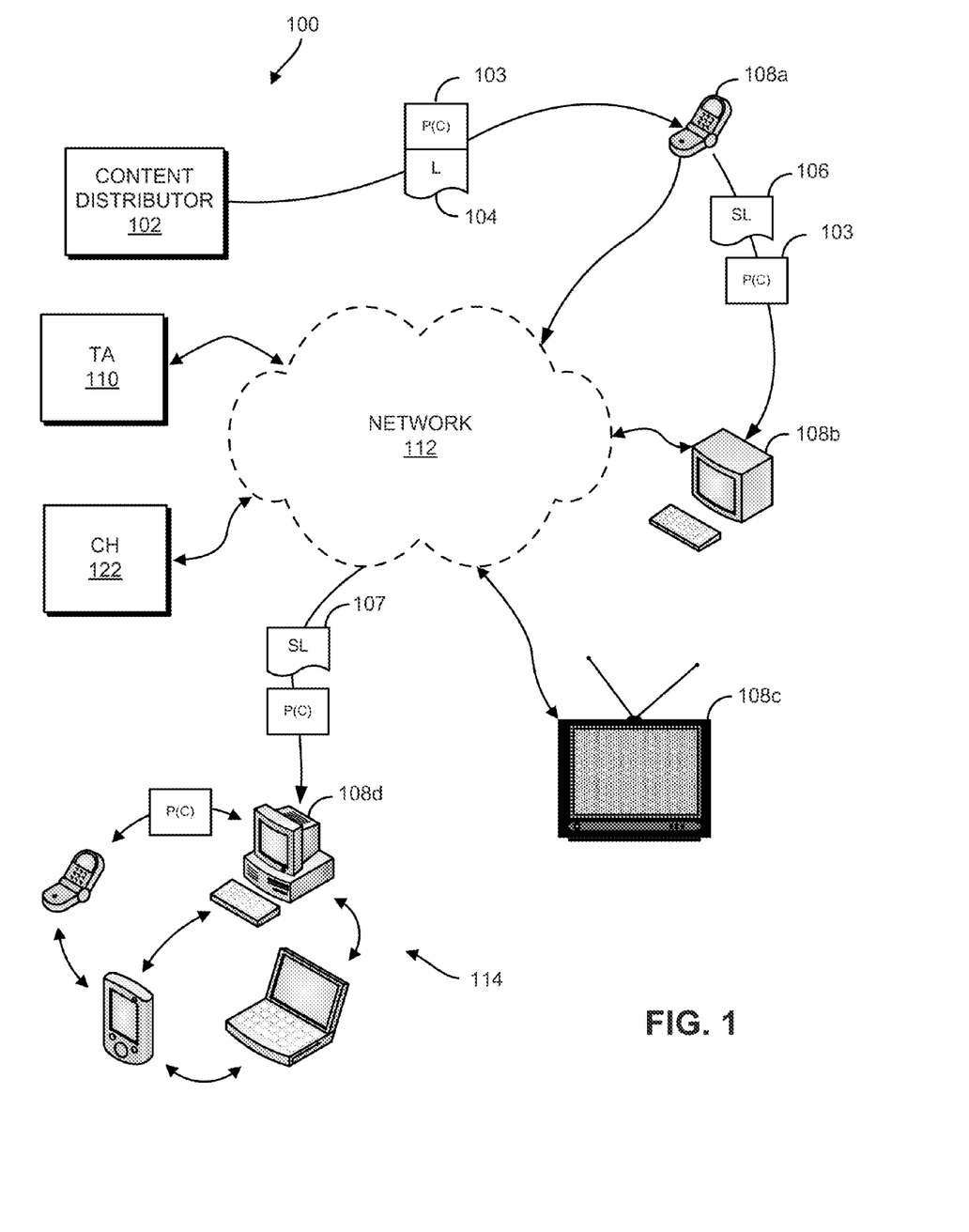
FIG. 1 shows an example of a system for facilitating controlled, peer-to-peer sharing of electronic content.

FIG. 1 shows an example of a system 100 for facilitating controlled, peer-to-peer sharing of electronic content. As shown in FIG. 1, an entity 102 holding rights in electronic content 103, packages the content for distribution and consumption by end users 108a-d (referred to collectively as "end users 108" or "peers 108", where reference numeral 108 refers interchangeably to the end user or the end user's computing system, as will be clear from the context). For example, entity 102 may comprise a content owner, creator, or provider, such as a musician, movie studio, publishing house, software company, author, mobile service provider, Internet content download or subscription service, cable or satellite television provider, the employee of a corporation, or the like, or an entity acting on behalf thereof, and content 103 may comprise any electronic content, such as digital video, audio, or textual content, a movie, a song, a video game, a piece of software, an email message, a text message, a word processing document, a report, an electronic book or periodical, or any other entertainment, enterprise, or other content.

In the example shown in FIG. 1, entity 102 associates a license 104 with the content 103. License 104 is based on the policies or other wishes of entity 102, and specifies permitted and/or prohibited uses of the content and/or one or more conditions that must be satisfied in order to make use of the content, or that must be satisfied as a condition or consequence of use. In one embodiment, the license may specify whether a recipient of the content is allowed to share the content with another peer 108. The content may also be secured by one or more cryptographic mechanisms such as encryption or digital signature techniques, for which a trust authority 110 may be used to obtain the appropriate cryptographic keys, certificates, and/or the like.

As shown in FIG. 1, packaged content 103 and licenses 104 can be provided to end users 108 by any suitable means, such as via a network 112 like the Internet, a local area network, a wireless network, a virtual private network, a wide area network, and/or the like, via cable, satellite, broadcast, or cellular communication, and/or via recordable media such as a compact disc (CD), digital versatile disk (DVD), a flash memory card (e.g., a Secure Digital (SD) card), and/or the like. Packaged content 103 can be delivered to the user together with license 104 in a single package or transmission, or in separate packages or transmissions received from the same or different sources.

The end user's system (e.g., a personal computer 108, a mobile telephone, a television and/or television set-top box, a portable audio and/or video player, a tablet, an electronic book reader, and/or the like) contains application software, hardware, and/or special-purpose logic that is operable to retrieve and render the content. The user's system also preferably includes software and/or hardware, referred to herein as a digital rights management engine, for evaluating the license 104 associated with the packaged content 103 and enforcing the terms thereof (and/or enabling the content rendering application to enforce such terms), such as by selectively granting the user the ability to use the content, or to share the content (and/or a license thereto) with others only if permitted by the license 104. For example, in a preferred embodiment the digital rights management engine is operable to evaluate a license 104 to determine whether the content may be shared with one or more peers 108b, 108d, and, if sharing is allowed, to prepare the content and/or license to facilitate such sharing, as described in more detail below. For example, the digital rights management engine of user 108a, may prepare a sharing license 106 based on license 104 for use by a peer 108b, and a second sharing license 107 for use by a peer 108d. Licenses 106 and 107 may be the same, or may be especially targeted to the recipient or the recipient's system, and/or may convey different rights to the content (e.g., based on the capabilities of the recipient's system).

The digital rights management engines of peers 108 may be structurally or functionally integrated with a content rendering application, or may comprise a separate piece of software and/or hardware. Alternatively, or in addition, a user's system may communicate with a remote system (e.g., a server, another device in the user's network of devices 114 (such a collection of devices is sometimes referred to as a "domain"), such as a personal computer or television set-top box, and/or the like) that uses a digital rights management engine to make a determination as to whether to grant the user access to content previously obtained or requested by the user.

The digital rights management engine, and/or other software on the user's system, or in remote communication therewith, may also record information regarding the user's access to or other use of the protected content. In some embodiments, some or all of this information might be communicated to a remote party (e.g., a clearinghouse 122, the content creator, owner, or provider 102, the user's manager, an entity acting on behalf thereof, and/or the like), e.g., for use in allocating revenue (such as royalties, advertisement-based revenue, etc.), determining user preferences, enforcing system policies (e.g., monitoring how and when confidential information is used), and/or the like. It will be appreciated that while FIG. 1 shows an illustrative architecture and a set of illustrative relationships, the systems and methods described herein can be practiced in any suitable context, and thus it will be appreciated that FIG. 1 is provided purposes of illustration and explanation, not for purposes of limitation.

Figure 2:
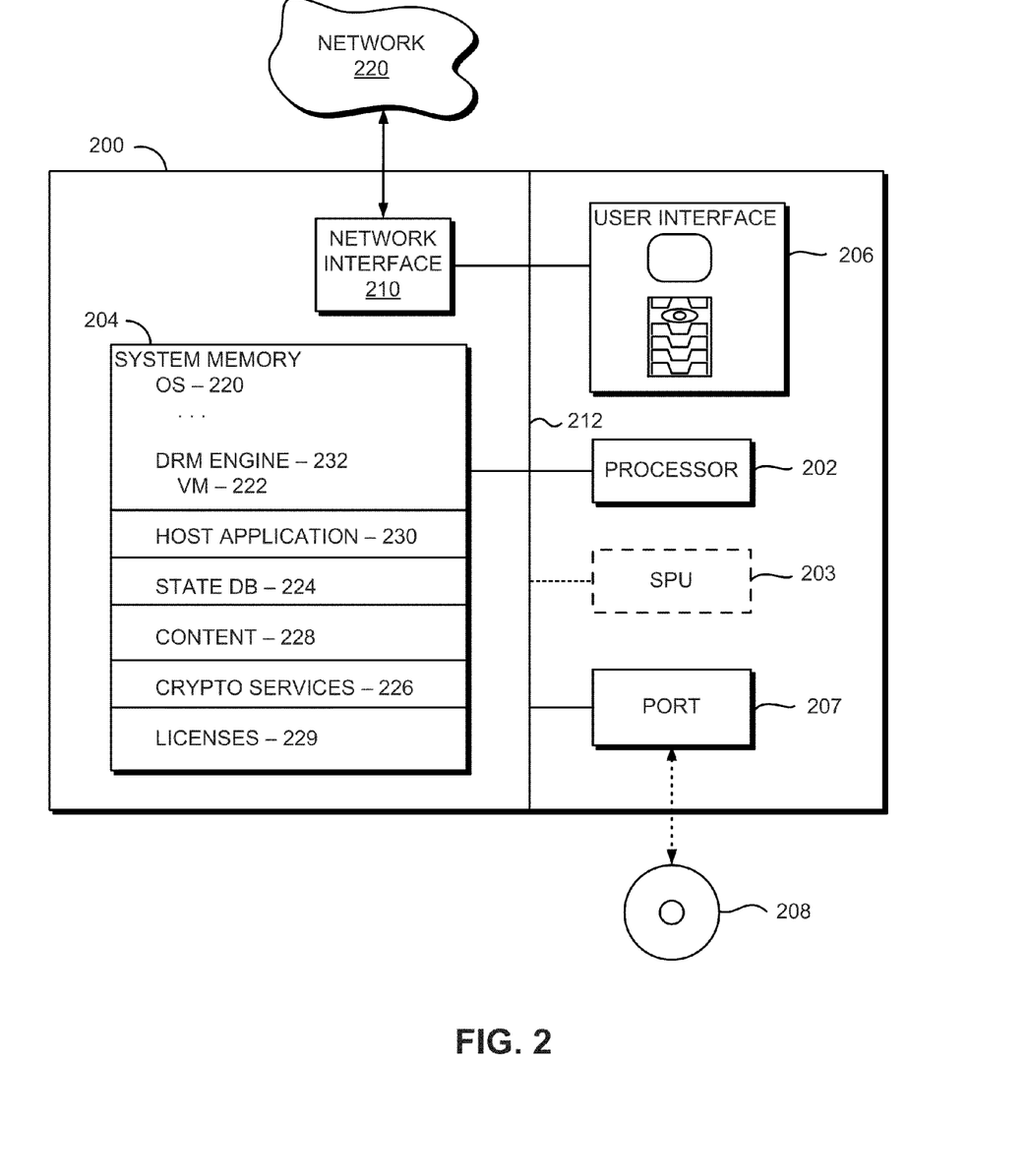
FIG. 2 shows a more detailed example of an illustrative system that could be used to practice embodiments of the inventive body of work.

FIG. 2 shows a more detailed example of a system 200 that could be used to practice embodiments of the inventive body of work. For example, system 200 might comprise an embodiment of an end user's device 108, a content provider's device 102, and/or the like. For example, system 200 may comprise a general-purpose computing device such as a personal computer or network server, or a specialized computing device such as a cellular telephone, personal digital assistant, portable audio or video player, electronic book reader, tablet, television set-top box, kiosk, gaming system, or the like. System 200 will typically include a processor 202, memory (i.e., a computer-readable medium) 204, a user interface 206, a port 207 for accepting removable memory 208, a network interface 210, and one or more buses 212 for connecting the aforementioned elements. The operation of system 200 will typically be controlled by processor 202 operating under the guidance of programs stored in memory 204. Memory 204 will generally include both high-speed random-access memory (RAM) and non-volatile memory such as a magnetic disk and/or flash EEPROM. Some portions of memory 204 may be restricted, such that they cannot be read from or written to by other components of the system 200. Port 207 may comprise a disk drive or memory slot for accepting computer-readable media 208 such as CD-ROMs, DVDs, memory cards, SD cards, diskettes, other magnetic or optical media, and/or the like. Network interface 210 is typically operable to provide a connection between system 200 and other computing devices (and/or networks of computing devices) via a network 220 such as the Internet or an intranet (e.g., a LAN, WAN, VPN, etc.), and may employ one or more communications technologies to physically make such connection (e.g., wireless, Ethernet, and/or the like). In some embodiments, system 200 might also include a processing unit 203 that is protected from tampering by a user of system 200 or other entities. Such a secure processing unit can help enhance the security of sensitive operations such as key management, signature verification, and other aspects of the digital rights management process.

As shown in FIG. 2, memory 204 of computing device 200 may include a variety of programs or modules for controlling the operation of computing device 200. For example, memory 204 will typically include an operating system 220 for managing the execution of applications, peripherals, and the like; a host application 230 for rendering protected electronic content; and a DRM engine 232 for implementing some or all of the rights management functionality described herein. As described in the '693 application, DRM engine 232 may comprise, interoperate with, and/or control a variety of other modules, such as a virtual machine 222 for executing control programs, and a state database 224 for storing state information for use by virtual machine 222, and/or one or more cryptographic modules 226 for performing cryptographic operations such as encrypting and/or decrypting content, computing hash functions and message authentication codes, evaluating digital signatures, and/or the like. Memory 204 will also typically include protected content 228 and associated licenses 229, as well as cryptographic keys, certificates, and the like (not shown).

One of ordinary skill in the art will appreciate that the systems and methods described herein can be practiced with computing devices similar or identical to the system illustrated in FIG. 2, or with virtually any other suitable computing device, including devices that do not possess some of the components shown in FIG. 2 and/or devices that possess other components that are not shown. Thus it should be appreciated that FIG. 2 is provided for purposes of illustration and not limitation.

The systems and methods described herein can be used to enable the controlled, peer-to-peer sharing of electronic content in many different contexts, several examples of which are described below.

Sharing a Computer Game with a Peer

In one example embodiment, a DRM-protected computer game may have an associated license that allows a user to share a version of the game with reduced capabilities. The reduced capabilities could be game resources specific to the game, such as the number of "lives" in an action game, the amount or type of ammunition in a war game, the number of levels to which a user is allowed to progress, and/or the like.

For example, during a playing session, a game (or a DRM engine managing use of the game) might evaluate an associated license (e.g., by performing the "Play" action in a license such as that described in the '693 application) to determine if a user has any more lives remaining. The game session might start with a certain quantity of game resource(s) (e.g. a certain number of "lives"), and decrement that quantity each time a certain action (e.g., the "Play" action) is executed. When there are no more game resources left, further attempts to execute the action will be denied.

As another example, a game might increment the level by performing a custom 'ChangeLevel' action when the level changes. The number of times this action is called corresponds to the level in the game. When the level reaches a predefined maximum during a given session, further calls to perform the action will be denied.

As yet another example, a game might set initial values for game resources at the start of a session, and use a custom 'TakeGameResources' action to decrement the values for these game resources at various times or upon the occurrence of various predefined conditions. When there are no resource(s) left the action will be denied.

In the foregoing examples, the original copy of a license might grant the user a larger number/higher quantity of game resource as compared to a shared copy of the license (e.g., five lives, as opposed to one). The recipient peer would thus be allowed to play the game, but with reduced capabilities. The recipient peer could then choose to purchase the full-featured game if s/he liked the shared version received from the sharing peer.

Sharing Media with Reduced Viewing Time

As another example, a piece of DRM-protected media content may have a license allowing the content to be shared with a peer; however, the license associated with the shared copy may allow only a small part of the media to be played during a given playback session (e.g., a limitation on the cumulative rendering time). In one embodiment, a user might be allowed to play the same content again for the same amount of time after quitting and restarting the application.

Sharing Media with a Fixed Number of Plays and/or Expiration Time

As yet another example, a piece of DRM-protected content may have a license that allows the content to be shared with a peer with the restriction that the peer has a fixed number of plays available to it, and/or an expiration date after which the content cannot be played, regardless of the number of plays that have been used.

To implement this feature, in one embodiment the receiving peer allows a semi-trusted control program to write to a persistent location (e.g., a state database, as described in the '693 application) in order to save the play count state between application restarts. In one embodiment, a peer may be issued the sharing license only if it can provide the semi-trusted control program with access to a persistent store; if the receiving peer does not have this capability then the sending peer preferably refuses to issue the sharing license to the recipient.

The following sections provide a more detailed description of preferred embodiments of a content sharing framework, including examples of how peer-to-peer sharing could be implemented in the context of a DRM system such as that described in the '693 application.

Peer-to-Peer Sharing Rights

A DRM license can be used to encode the rights granted by a content creator/owner to a user of the content. A content creator/owner who wishes to allow users to share a content item in a peer-to-peer fashion may do so by specifying the rights for this form of sharing at the time of publishing or otherwise distributing the content item. For example, the original license associated with a content item could include basic rules for using the content, as well as rules governing sharing, if any. In a preferred embodiment, the sharing rights provided by the original author/content owner are propagated, or otherwise adhered to, during peer-to-peer sharing. In the context of a DRM engine such as that described in the '693 application, a control program associated with the content could have a "Share" action that returns the control object for a Sharing License (e.g. as a byte array returned as part of an extended status block when the Share action is performed).

Recipient Authentication

In one embodiment, a Sharing Peer authenticates a Receiving Peer before issuing a Sharing License to that peer. The authentication step helps to ensure that the Sharing Peer does not share the content with a compromised and/or otherwise untrusted peer. For example, peers can authenticate themselves via a TLS handshake with mutual authentication. Each peer can use an asymmetric key pair (e.g., Public Key Certificate and Private Key) for the handshake. The peers can check the certificate for revocation to ensure that the peer on the other end of the communication is trusted. In one embodiment, nodes can be revoked via a certificate revocation list mechanism if a client gets compromised.

Key Rebinding

In one embodiment, the content key is re-bound to a node governed by the recipient. The content key is encrypted using either a symmetric key or asymmetric key-pair from this node. In one embodiment, the key is re-bound to the personality node of the Receiving Peer. For example, the key derivation and distribution techniques described in the '693 application could be used, which support at least two methods of key binding, namely, public binding and symmetric binding.

When a Sharing Peer uses symmetric binding, it uses the recipient's symmetric key for encrypting the content key. This key is governed by the recipient and is preferably not released outside that entity. In one embodiment, the Sharing Peer sends the content key to the recipient over a secure channel (established using the TLS handshake) asking the recipient to encrypt the content key using the symmetric key. The recipient can then return the encrypted content key back to the Sharing Peer. The Sharing Peer will then use the encrypted value returned by the Receiving Peer to generate the Sharing License.

When the Sharing Peer uses public binding, it uses an asymmetric key for encryption. It encrypts the key using the public key of the Receiving Peer and uses the encrypted key to generate the Sharing License. The Sharing Peer can optionally verify the public key certificate of the recipient. This step is optional, since a related certificate will typically already have been verified as part of the TLS handshake.

License Targeting

In some embodiments, the content creator/owner may require a DRM license to be targeted to specific node(s). Accordingly, a Sharing License might specify a node or a list of nodes for targeting. However, since the specific node ids may not be known at the time the license is generated, in one embodiment, the Sharing License has placeholders for target node ids that can be filled in at the time a Sharing Peer creates the license for a Receiving Peer (e.g., to be specified as attributes to the DRM control).

In one embodiment, nodes are classified into the following categories: (a) personality nodes; (b) user nodes, of which there can be shared user nodes (e.g., subscription user nodes) and unique user nodes; and (c) subscription nodes. For certain types of nodes, such as subscription nodes or shared user nodes, the node-id may be known in advance at the time of publishing the license. In this case a mechanism can be used to say that the same node must be reachable for the Sharing License control program if the Sharing License is to be targeted to these nodes.

In cases where the node-id is not known in advance, the Sharing License could define placeholders for these node-ids. The Sharing Peer could ask the Receiving Peer for a list of node-ids of each type. The Receiving Peer could then respond with a list of node-ids sorted by the preferred order of priority for the recipient. The Sharing Peer would still have control over the specific node-id(s) that it picks to replace the placeholders when creating the Sharing License.

License Signing and Semi-trusted Controls

In one embodiment, the Sharing Peer signs the license to enable the Receiving Peer to use the license and enforce the rights granted in that license. Since, in such an embodiment, the Sharing License is not signed by a trusted, third-party DRM and/or content service, but by a peer, the recipient may not be able to trust a control program in the license in the same way. Conceptually, the control program in the Sharing License is at an intermediate level of trust, which will sometimes be referred to herein as "semi-trusted." Because the control is semi-trusted, the recipient may not allow the same privileges as it provides to a trusted control program. For example, the recipient may not allow the control program to write to persistent storage, and/or it may allow the control to write only to a separate (persistent) sandbox from the one permitted to trusted control programs, and/or there may be space and expiration time constraints on the persistent storage that is provided for a semi-trusted control.

In one embodiment, secure storage is implemented using a secure database such as that described in the '693 application, which can, in some embodiments, be non-persistent or persistent. If a non-persistent version of such a database is used, it could be mapped to a temporary memory-based storage which is wiped out when the application terminates. If a persistent database is used, it could have a restriction on its capacity and may map to a file system in which objects have an expiration date, and/or get deleted automatically to make space for more recent objects. In one embodiment, a content file, as well as database entries corresponding to the Sharing License for the content file, would typically either expire at the same time or be deleted at the same time in order to conserve space.

Backward Compatibility

In one embodiment, a DRM license for peer-to-peer sharing contains enhancements/extra information for sharing the content in addition to the normal usage rights for consuming the content. In a system such as that described in the '693 patent, extensions to DRM objects to support peer-to-peer sharing can be made backwards compatible, such that a DRM client that does not understand these, enhancements is preferably able to use the license for rendering the content on a device, even if it is unable to use the enhancements/extra information in order to share the content with a peer.

For example, a DRM license such as that described in the '693 application is typically made up of various DRM objects, and an extension mechanism can be used to extend such objects to carry optional as well as mandatory extra data. For purposes of backwards compatibility, extensions for peer-to-peer sharing data can be implemented as optional data, and a DRM client that cannot understand these extensions is able to skip them and use the other parts of the license. To further reduce the chance of tripping up or interfering with existing DRM client implementations, these extensions can be carried as external extensions.

Recipient Capabilities

In some embodiments, a Sharing Peer may need to determine (e.g., during a handshake process) the capabilities of a Receiving Peer before issuing a Sharing License. If the Receiving Peer is not capable of honoring the license, the Sharing Peer may refuse to issue a Sharing License. For example, if the Sharing License is time-limited, it might require the Receiving Peer to be capable of providing trusted time to the license execution environment. If the Receiving Peer is not capable of providing trusted time, then the Sharing Peer refuses to issue a Sharing License. As another example, if the Sharing License needs to write to persistent storage, then the recipient will need to be capable of providing the license execution environment with access to persistent storage. If the recipient is not capable of doing this, then the Sharing Peer can refuse to issue a Sharing License.

In one embodiment, SAML assertions (e.g., issued by the DRM system's trusted backend to the DRM client at personalization/manufacturing time) can be used to provide attribute statements about a DRM client's capabilities. SAML assertions can (be trusted because they are issued by trusted principals. SAML assertions are also a flexible way to specify client capabilities, because they can be updated dynamically (e.g. a new SAML assertion could be issued to a DRM client if the capabilities of that client are upgraded through a software update). In a preferred embodiment, these assertions would be accessible to the DRM client during the handshake and information exchange phase. For example, a recipient could send SAML assertions to the Sharing Peer indicating its capabilities. The Sharing Peer could check these assertions to ensure that it is issuing the Sharing License to a peer that is capable of honoring the rights and obligations in the Sharing License.

A more lightweight approach could be implemented using DRM engine properties. Some properties could be standardized and used to indicate certain capabilities. Although the properties may not themselves be certified by the service backend, in one embodiment, a DRM client itself goes through the authorization process. The client capability could be checked at this point and burnt into the binary. If the recipient capabilities will not change over the life of the DRM client then this approach could be advantageous. In one embodiment, this could be implemented as a read-only property, which could optionally be exposed at the application level by the DRM client. In one embodiment, the value of this property is a 32-bit integer in network (big-endian) byte order which could be broken down into a major version (one byte), minor version (one byte), and capabilities (16-bits bit-field). For example, the bit-flags could be used to indicate whether the DRM client has a persistent state database, a non-persistent state database, is able to maintain trusted time, and/or the like.

Several enhancements and extensions to DRM systems such as those described in the '693 application are described below for facilitating peer-to-peer sharing.

Control Object Extension

As previously indicated, in one embodiment, if a DRM license permits peer-to-peer sharing, it indicates this via an extension for the DRM Control Object. Having the extension would enable an application program to determine if a license permits peer-to-peer sharing without evaluating the license. This extension is preferably an external extension in order to facilitate backward compatibility with existing, non-peer-to-peer-capable clients that cannot handle the extension and are capable of only dealing with the original license. In a preferred embodiment, this extension will not carry the critical flag. In an alternative embodiment, the protocol field of the control (Control Protocol) could be versioned to indicate that the control supports the peer-to-peer extension; however, this might break compatibility with existing clients for which the original license would be valid and would need to work correctly, even if the sharing functionality does not work.

Example data structures are shown below:

```
aligned(8) class P2PExtension extends
    ExtensionData(type='P2P') {
    int(32) minimumP2PVersion;
    int(32) clientCapabilities;
}
<Bundle>
    ...
    <Control xmlns="http://www.octopus-
    drm.com/profiles/base/1.0" Id="foo" uid="a:b:c">
        </Control>
    ...
    <ExtensionList>
        <Extension id="bar" subject="a:b:c">
            <P2P>
                <MinimumP2PVersion
    encoding="base64">AAAAA==</MinimumP2PVersion>
                <ClientCapabilities>...</ClientCapabilities>
            </P2P>
        </Extension>
    </ExtensionList>
    ...
</Bundle>
```

Control Attributes

Inherited Attributes

In one embodiment, attributes for the original control program may be marked as "inherited" (e.g., via a property named "inherited"). If this property is present and has the value "true," the attribute will be applied to the sharing control. In one embodiment, if the sharing control (child control) also has an attribute with the same name, the child's attribute will take precedence. In one embodiment, the inherited property is itself inherited (e.g., you can stop the propagation of the attribute by defining an attribute on the child control):

```
<oct:Attribute name="urn:foo:bar"
    inherited="true">BAZ</oct:Attribute>
```

For example, if a Sharing License needs to restrict sharing within a particular domain, the control program(s) (e.g., Original License as well as Sharing License) could check the node reachability condition for the domain node. An attribute for the original license would specify the domain node-id and indicate that the attribute is inherited. The P2P sharing extension will treat this as an attribute that is also present for the Sharing License when creating the Sharing License.

As another example of how inherited attributes could be used, if a Sharing License needs to restrict sharing within a subscription group, both the Original License and the Sharing License would check the node reachability condition for the subscription node (or the subscription-user node, as applicable). If this attribute is designated as "inherited", it will be used in creating the Sharing License.

Attributes for the Sharing Control

In an illustrative embodiment, a Sharing Control may have some or all of the following optional attributes:

| Name | Type | Description |
|---|---|---|
| target-device-node | String Attribute | contains URN for the personality node |
| target-user-nodes | Array Attribute | array containing URNs of user nodes to which the license needs to be targeted |
| target-subscription-nodes | Array Attribute | array containing URNs of subscription nodes to which the license needs to be targeted |
| current-date | String Attribute | Current Date (in seconds from an epoch) |

In one embodiment, a Sharing Control's set of attributes comprises inherited attributes along with any other attributes specified in the Sharing Control, where the attributes specified in the Sharing Control take precedence over inherited attributes.

In one embodiment, if the content of an attribute element is /PLACEHOLDER/ it means that it will be replaced at the time of creation of the Sharing License. If it is any other string then it is treated as a literal value (i.e., not replaced).

EXAMPLE

```
<Control xmlns="http://www.octopus-
    drm.com/profiles/base/1.0" uid="uid:p2p:001">
    <AttributeList>
        <!-- String Attribute to specify target device
    node -->
        <Attribute name=" urn:p2p:target-device-node"
    type="string">/PLACEHOLDER/</Attribute>
        <!-- ArrayAttribute to specify target user nodes
    -->
        <Attribute name=" urn:p2p:target-user-nodes"
            type="array">
            <Attribute>/PLACEHOLDER/</Attribute>
            <Attribute>/PLACEHOLDER/</Attribute>
            <Attribute>/PLACEHOLDER/</Attribute>
            ...
        </Attribute>
        <!-- ArrayAttribute to specify target
    subscription nodes -->
        <Attribute name=" urn:p2p:target-user-nodes"
            type="array">
            <Attribute>/PLACEHOLDER/</Attribute>
            <Attribute>/PLACEHOLDER/</Attribute>
            <Attribute>/PLACEHOLDER/</Attribute>
            ...
        </Attribute>
        ...
        <!-- StringAttribute to specify current date
            (could be used in a time-limited license) -->
        <Attribute name="urn:p2p:current-date"
    type="string">/PLACEHOLDER/</Attribute>
    </AttributeList>
</Control>
```

Computing Sharing License

In one embodiment, as part of the information exchange phase, the receiving peer would send its personality node to the sharing peer and also a parameter that indicates whether the content key should be encrypted using public key encryption or secret key encryption. Depending on the value of the parameter, the sharing peer will use the secret key/public key mechanism for encryption.

If symmetric key binding is used, the Sharing Peer sends a command to the Receiving Peer over a secure channel asking it to encrypt the content key. The Receiving Peer will respond with the content key encrypted with the symmetric sharing key from its personality node. The Sharing Peer will then create the license and insert it into (or otherwise associate it with) the content as may be needed before sending the content to the Receiving Peer.

If public key binding is used, then the Sharing Peer encrypts the key using the Sharing Public Key of the personality or user node of the Receiving Peer that it got during the information exchange phase of the P2P message exchange protocol (e.g., provided the certification path evaluates to one of the trusted root certificates).

In one embodiment, information sent by the Requesting Peer is used to target the license. Information obtained from the environment of the Sharing Peer could also be used to further constrain the values for the attributes of the Sharing Control. One reason why values from the environment of the Sharing Peer may be used to constrain the information obtained from the Receiving Peer is that the original license is preferably evaluated to obtain the content key before creating the Sharing License. Using information about the reachable nodes in the environment of the Sharing Peer to constrain the list supplied by the Receiving Peer would be an extra check to ensure that the Sharing License would also evaluate as it does in the recipient's environment.

For example, consider the situation in which a Sharing License needed to check for membership in two subscription groups that the Sharing Peer is also a member of. Assume that the requesting peer sent the following URNs for subscription nodes {A, B, C, D} which also may specify the order of preference for the subscription nodes to be used for targeting. Also assume that the sharing control requires subscription nodes for targeting the license and has asked for two such nodes, and assume that in the environment of the sending peer, links exist to the subscription nodes {B, D, F, G}.

Thus, in this example, the attribute value that would be sent to the Sharing Control would be {B, D}. If there is no overlap (or insufficient overlap), the Sending Peer may refuse to issue a Sharing License.

Controller Signature

In one embodiment of a system that uses a DRM engine as described in the '693 application, the Controller object will have HMAC signature(s) to tie it with the Content Key and Control Program objects, as well as a PKI signature to indicate it has been created by a trusted peer.

Share Action

As indicated above, in embodiments that makes use of a DRM engine such as that described in the '693 application, a new action—'Share'—can be introduced for peer-to-peer sharing, and DRM controls that support peer-to-peer sharing can, for example, export the following methods:

Control.Actions.Share.Init—This optional routine can have the same semantics as Control.Actions.<Action>.Init, as described in the '693 application.

Control.Actions.Share.Check—This routine can have the same semantics as Control.Actions.<Action>.Check, as described in the '693 application.

Control.Actions.Share.Perform—This routine can have the same semantics as Control.Actions.<Action>.Perform, as described in the '693 application. If the routine is successful, the ResultCode is 0 and the next item on the stack is a pointer to the extended status block (ESB). An example ESB structure is described in the '693 application. In this embodiment, the ESB Parameters are in the form of a ValueListBlock. For the 'Share.Perform' routine this ValueListBlock can contain a version number, a string indicating how the sharing_control should be interpreted, and a sharing_control byte array containing a Control Object for use in the Sharing License.

Control.Actions.Share.Describe—This optional routine can have the same semantics as Control.Actions.<Action>.Describe, as described in the '693 application.

P2P Message Exchange

In a preferred embodiment, when two peers who participate in P2P sharing interact with each other, they do so in a series of message exchanges. The discussion below describes examples of a message exchange between these participants in a preferred set of embodiments.

Protocol Binding

Although any transport binding could be used, for the sake of illustration the following description will assume that Bluetooth links are used, and that clients will support Bluetooth as the transport protocol for P2P sharing.

Message Exchange Phases

Discovery

Bluetooth discovery typically takes place in two phases: device discovery, in which peers discover each other and become part of an ad-hoc Bluetooth network (piconet); and service discovery, in which peers advertise that they offer a custom Bluetooth Service (e.g., "P2P Sharing Service") to each other. When a peer discovers another peer that offers this service it may indicate this status to the user. The user may then choose to proceed with P2P Sharing with that device by going through additional message exchanges. In one embodiment, standard Bluetooth APIs are used for both phases of the discovery process.

When the two peers start the P2P sharing application they will both enter the discovery phase. The peers enter device discovery and find all Bluetooth devices in the vicinity. Class of Device (COD) filtering may be used to filter for the class of devices in which one is interested. For example, the devices can be filtered to only include mobile handsets and to filter out all other devices such as PCs and wireless headphones that are not of interest.

In this example, service discovery is performed next. Bluetooth allows applications to define their own custom services. A custom Bluetooth service is identified by a GUID. During service discovery, when a device discovers another device that supports the P2P Sharing Service, it can provide a visual indication to the user to indicate that the device supports this service (e.g. show the device with a different icon or with a different color). Any GUID can be chosen for this service. For example:

--- fd88af97-11d7-4078-96d8-f30bf8244988

---

Handshake

In one embodiment, a standard TLS handshake with mutual authentication can be used for authenticating peers to each other and to establish a secure authenticated channel (SAC) to exchange information over a Bluetooth link. TLS is a standard mechanism for creating a secure authenticated channel. Hence message exchange sequences for TLS will not be described in detail here.

Information Exchange

In one embodiment, for simplicity, one large message can be used, containing all the pieces of information about the peer that it needs to send to the other peer. The information exchange can be thought of as an extension of the handshake procedure. The recipient of the last message during the TLS handshake sends its own information to the other peer and the other peer responds by sending the corresponding information about itself to the sender.

```
// base class for all P2P Requests
aligned(8) abstract class P2PRequest {
    int(32)    size; // size of the instance excluding
    the size field
    int(32)    requestType; // indicates what the
    request is for
}
// base class for all P2P Responses
aligned(8) abstract class P2PResponse {
    int(32)    size; // size of instance excluding the
    size field
    int(32)    responseType; // indicates what this
    response contains
    int(32)    resultCode;
}
// command types
#define P2P_REQUEST_INFO_EXCHANGE          (0)
#define P2P_REQUEST_CONTENT_QUERY          (1)
#define P2P_REQUEST_CONTENT_REQUEST        (2)
#define P2P_REQUEST_CONTENT_KEY_ENCRYPTION (3)
#define P2P_RESPONSE_INFO_EXCHANGE         (100)
#define P2P_RESPONSE_CONTENT_QUERY         (101)
#define P2P_RESPONSE_CONTENT_REQUEST       (102)
#define P2P_RESPONSE_CONTENT_TRANSFER      (103)
#define P2P_RESPONSE_CONTENT_KEY_ENCRYPTION (104)
// result codes
#define P2P_RESULT_SUCCESS                 (0)
#define P2P_RESULT_FAILURE                 (-1)
#define P2P_RESULT_NO_SUCH_ITEM            (-2)
#define P2P_RESULT_PERMISSION_DENIED       (-3)
// Information Exchange extends P2PResponse (this
    response can be sent spontaneously,
// not as a response to a request)
aligned(8) class P2PInformationExchange extends
    P2PResponse
    (responseType=P2P_RESPONSE_INFO_EXCHANGE) {
    int(16)    p2p_version;
    int(16)    client_capabilities;
    string     personality_node_id;
    string[ ]  reachable_user_node_list;
    string[ ]  reachable_subscription_node_list;
    boolean    need_public_key_scuba;
    {byte[ ]   public_scuba_cert;}
}
```

Content Query

One peer can ask another peer to provide a list of shareable content in order to present this content to the user. Alternatively, a peer can just push or zap shareable content (or a list thereof) to another peer. In both of these scenarios one peer creates a list of shareable content by inspecting the DRM license and P2P Control Object Extensions for each content item that the user is allowed to share. When the Requesting Peer asks for a list of shareable content, the Sharing Peer could generate a list of all shareable content and then filter it based on the capabilities of the Requesting Peer. For example, if the Requesting Peer cannot provide persistent database storage for semi-trusted controls, then content items which require this capability for the Sharing License can be filtered out of the list that is sent to the Requesting Peer. As another example, if the Requesting Peer cannot provide trusted time, then content items that require this capability for the Sharing License can be filtered out of the list that gets sent to the Requesting Peer.

```
// P2PContentQueryRequest
// this is the command sent by a peer to request a list
   of shareable content
aligned(8) class P2PContentQueryRequest extends
    P2PRequest (requestType=P2P_REQUEST_CONTENT_QUERY,
    size=4) {
}
// P2PContentQueryResponse
// this is the response sent by a peer containing a list
   of shareable content
aligned(8) class P2PContentQueryRequest extends
    P2PResponse
    (responseType=P2P_RESPONSE_CONTENT_QUERY)
{
    string[ ] content_id_list; // could be URLs, URNs, or
    in some local naming convention
}
```

Content Request

A content request is a message sent by a Receiving Peer to a Sharing Peer to ask for a content item (e.g., Pull Mode). The Sharing Peer responds to this message with a Content Transfer (on success) or returns a failure.

```
// P2PContentRequest
// this is the command sent by a peer to request an item
   of shareable content
aligned(8) class P2PContentRequest extends P2PRequest
    (requestType=P2P_REQUEST_CONTENT_REQUEST) {
    string content_id;
}
```

Content Transfer

A content transfer message is sent by a Sharing Peer to a Receiving Peer to send a content item. This could, for example, be spontaneous (Push Mode), or in response to the Content Request message (Pull Mode).

```
// P2PContentTransfer - Pull Mode
aligned(8) class P2PContentTransfer extends P2PRequest
    (responseType=P2P_RESPONSE_CONTENT_REQUEST) {
    byte[ ] content_file;
}
// P2PContentTransfer - Push Mode
aligned(8) class P2PContentTransfer extends P2PRequest
    (responseType=P2P_RESPONSE_CONTENT_TRANSFER) {
    byte[ ] content_file;
}
```

Content Key Encryption

In one embodiment, a Sharing Peer would use a message such as that shown below to send a content key over the SAC to the Receiving Peer if it needs to use symmetric key binding. The Receiving Peer would respond with the encrypted content key.

```
// P2PContentKeyEncryptionRequest
aligned(8) class P2PContentKeyEncryptionRequest extends
    P2PRequest
    (requestType=P2P_REQUEST_CONTENT_KEY_ENCRYPTION,
    size=4) {
    byte[ ] content_key;
}
// P2PContentKeyEncryptionResponse
aligned(8) class P2PContentKeyEncryptionResponse extends
    P2PResponse (responseType=
    P2P_RESPONSE_CONTENT_KEY_ENCRYPTION) {
    byte[ ] encrypted_content_key;
}
```

User Permission

In one embodiment, the application may need to ask for user permission before engaging in P2P sharing. This could, for example, be implemented using an authorization mechanism provided by the Bluetooth transport layer.

Example Use Case

Figure 3:
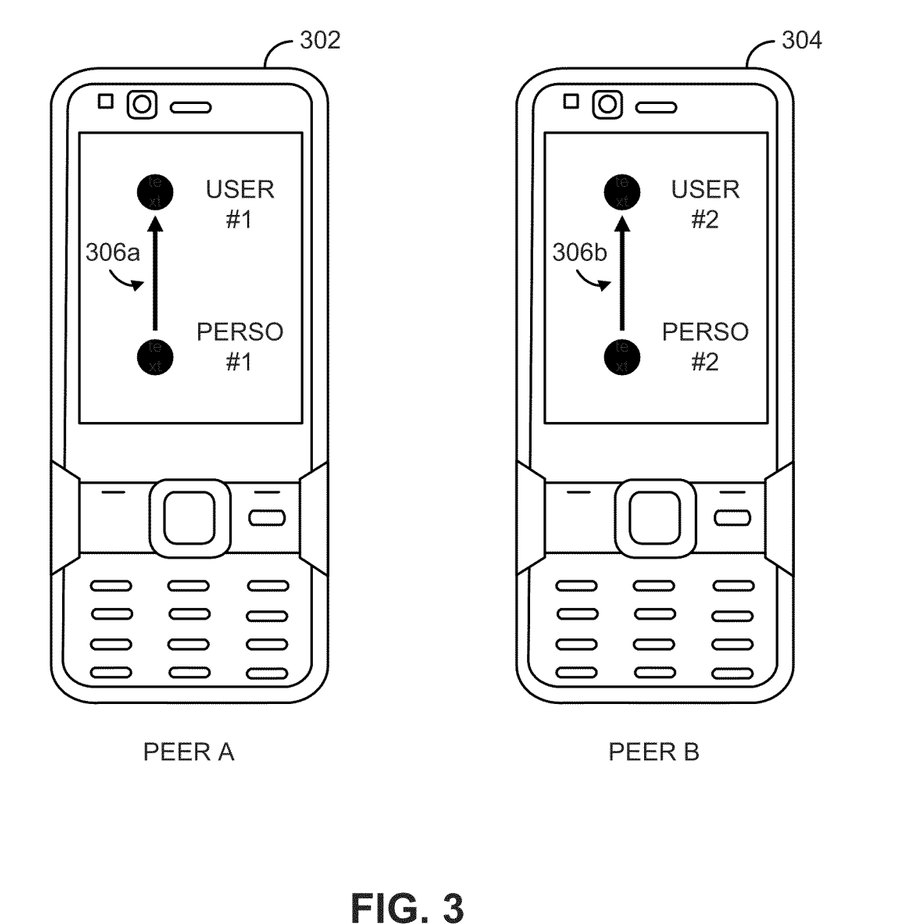
FIG. 3 shows two peers capable of participating in peer-to-peer content sharing in accordance with one embodiment.

FIG. 3 shows two peers (302, 304), each having a personality node and user node, with a node-link topology (306a, 306b) as shown on each peer.

Figure 4:
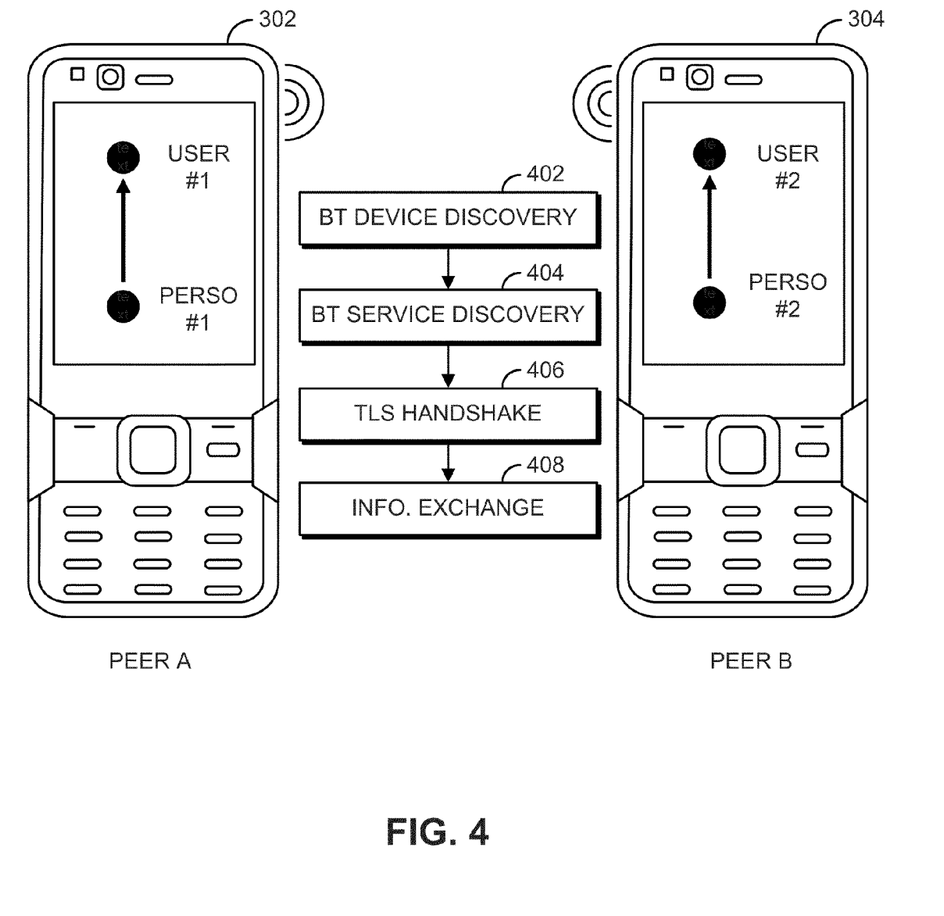
FIG. 4 shows the steps involved in an illustrative handshake and information exchange between two peers.

FIG. 4 shows the steps involved in an illustrative handshake and information exchange between two peers such as those shown in FIG. 3. As shown in FIG. 4, in the context of a Bluetooth communication, peers 302 and 304 will typically perform device and service discovery (402, 404), followed by a TLS handshake (406), and then the actual exchange of information (408) such as content, sharing licenses, and the like.

Examples of P2P Content Sharing

Figure 5:
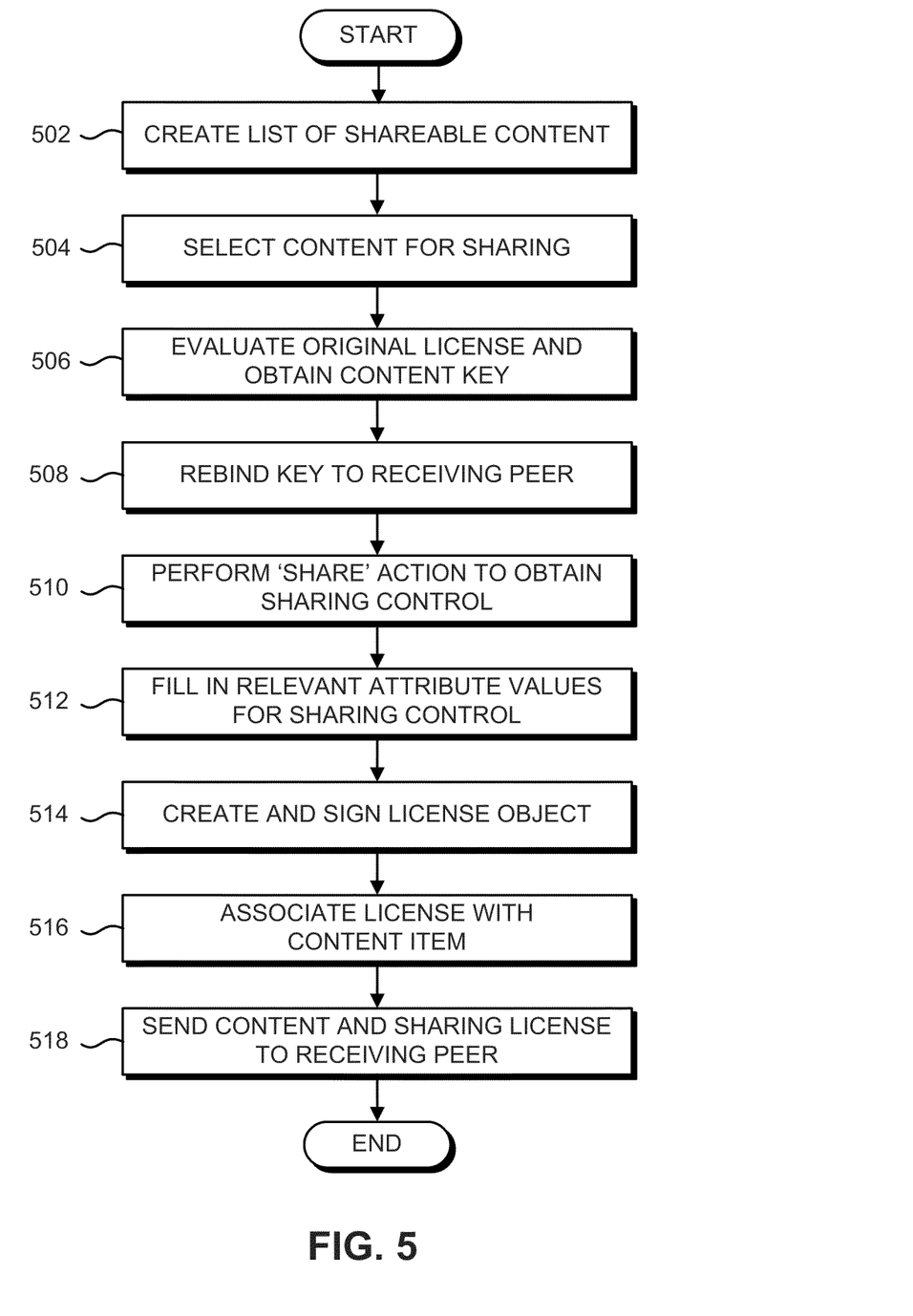
FIG. 5 shows an illustrative peer-to-peer push process.

FIG. 5 shows an illustrative process for implementing peer-to-peer push of a content item. As shown in FIG. 5, the Sharing Peer creates a list of shareable content (preferably filtered based on the Receiving Peer's capabilities) and presents it to the user of the Sharing Peer (502). When the user chooses to send one or more content items to the Receiving Peer (504), the Sharing Peer evaluates the original license associated with each content item and obtains the content key (506). Next, the Sharing Peer rebinds the key to the Receiving Peer (508), and performs the 'Share' action to obtain a Sharing Control (510). The Sharing Peer may then fill in any relevant attribute values for the Sharing Control (512), create the rest of the license object, and sign it (514). The Sharing Peer inserts this license into (or otherwise associates the license with) the content item (516), and then sends the content and the Sharing License to the Receiving Peer (518). Upon receipt, the Receiving Peer can only use the content item as per the rights specified in the Sharing License.

Figure 6:
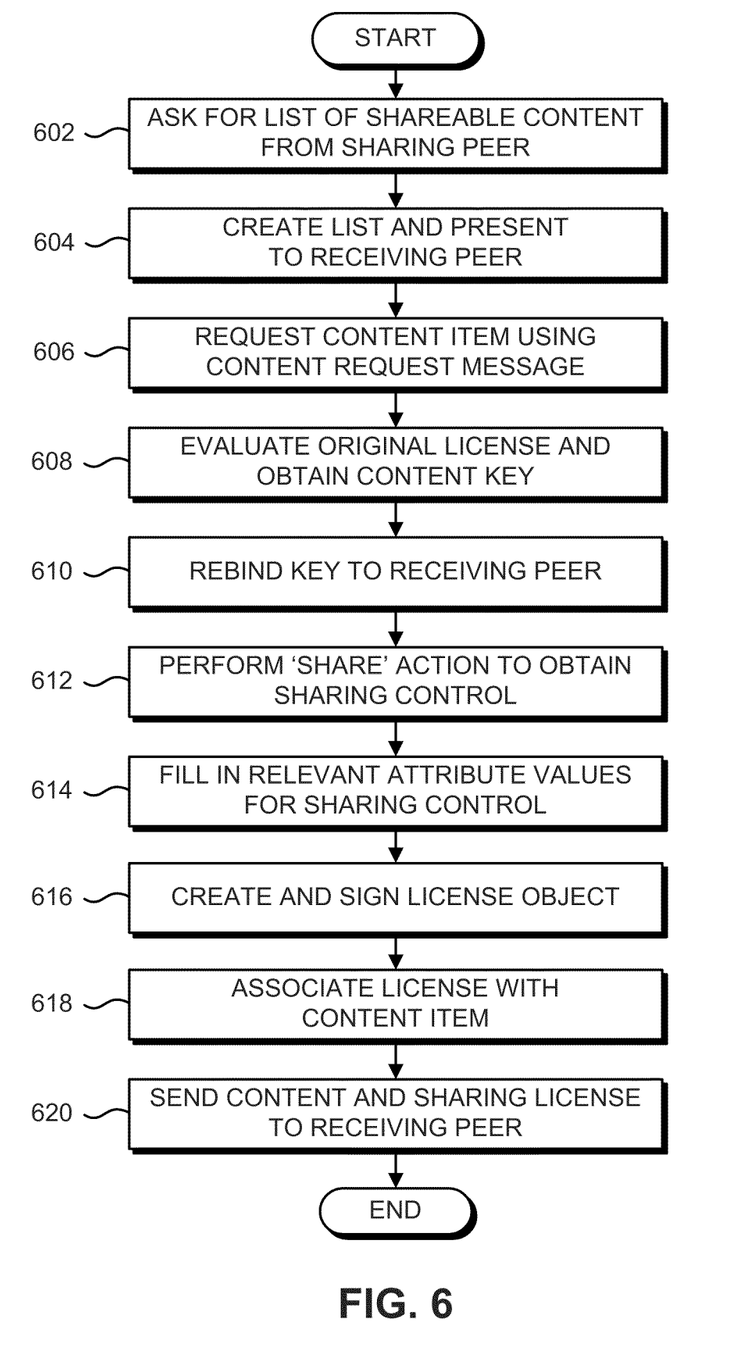
FIG. 6 shows an illustrative peer-to-peer pull process.

FIG. 6 shows an illustrative process for implementing peer-to-peer pull of a content item. As shown in FIG. 6, a Receiving Peer asks for a list of shareable content from a Sharing Peer (602). The Sharing Peer creates a list of shareable content (preferably filtered based on the Receiving Peer's capabilities), and presents it to the Receiving Peer (604). The Receiving Peer requests a content item using a Content Request Message (606). In response, the Sharing Peer evaluates the original license associated with the content item and obtains the content key (608). The Sharing Peer rebinds the key to the Receiving Peer (610), and performs the 'Share' action to obtain a Sharing Control (612). The Sharing Peer may then fill in any relevant attribute values for the Sharing Control (614), create the rest of the license object, and sign it (616). The Sharing Peer inserts this license into (or otherwise associates the license with) the content item (618), and sends the content item and the Sharing License to the Receiving Peer (620). Upon receipt, the Receiving Peer can only use the content item as per the rights specified in the Sharing License.

Figure 7:
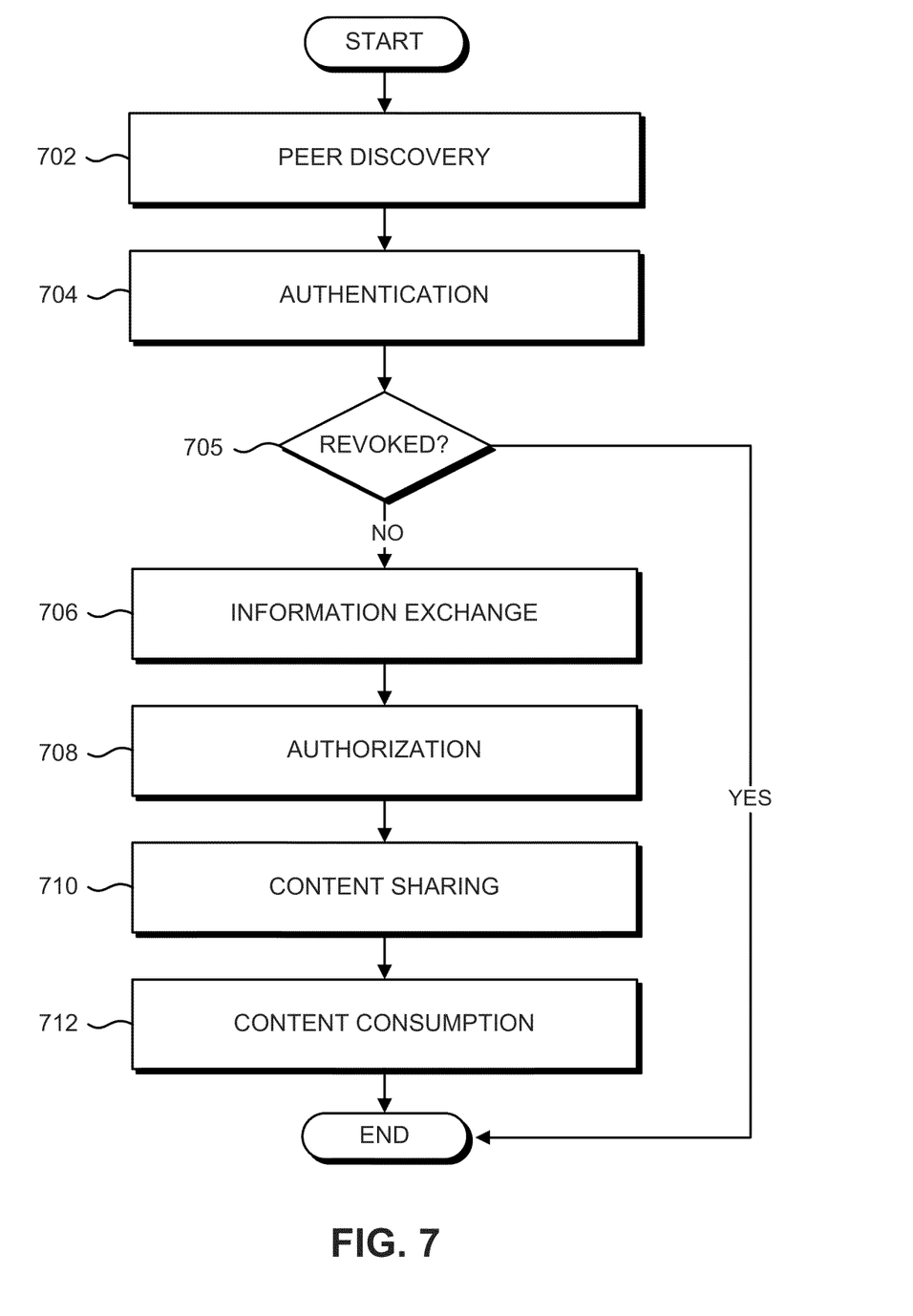
FIG. 7 shows an illustrative peer-to-peer sharing process.

FIG. 7 shows an illustrative process for P2P sharing between two devices. As shown in FIG. 7, in discovery step 702, peers discover each other through some suitable mechanism (e.g. Bluetooth discovery). For example, peers may advertise to each other that they support the P2P sharing service. In authentication step 704, peers perform a TLS handshake with mutual authentication in order to authenticate themselves to each other and to establish a secure authenticated channel (SAC). The handshake fails if either of the peers has been revoked (i.e., a "yes" exit from block 705), since revoked peers are not allowed to participate in P2P sharing. In one embodiment, each peer uses an asymmetric key pair for the handshake. Assuming neither peer has been revoked (i.e., a "no" exit from block 705), the peers exchange information with each other over the secure authenticated channel (SAC) (706). For example, in some embodiments some or all of the following information might be exchanged (or provided from one peer to the other):

Client capability information, such as whether they support persistent/non-persistent secure storage and/or secure time Client personality identifiers Reachable user node identifiers Reachable subscription node identifiers Information regarding whether the client requires key re-binding to use symmetric or public key binding An optional public Sharing Certificate if public key binding is to be used for key re-binding In some embodiments, the user may be asked for permission to continue with P2P sharing (708). In addition, a more-fine grained control may be offered on the content items themselves. For example, a user may be allowed to mark certain items as non-shareable. The peers share content either through a Push mode or a Pull mode by sending commands over the secure authenticated channel, as described above (710). The Sharing Peer inserts the Sharing License into (or otherwise associates the Sharing License with) the content item and sends it to the Receiving Peer, or, alternatively, the license may be delivered separately from the content item. The Receiving Peer consumes the content item under governance of the DRM system (712). The sharing rights for the content item are propagated to the recipient during P2P sharing and enforced during content consumption Thus, systems and methods have been described for enabling trusted, peer-to-peer sharing of protected content. Embodiments of the systems and methods described herein can enable some or all of the following:

Recipient authentication: Peers can connect to each other using an ad-hoc network and authenticate each other using DRM client credentials in order to determine if they can share content with each other. If a client gets compromised it can be revoked and upon revocation such a client will not be allowed to participate in P2P sharing Specifying sharing rights at the time of content publication: content owners can specify sharing rights at the time of content publication, including control program attributes for sharing controls (e.g. attributes to specify target device nodes or target subscription nodes), and through the inheritance of attributes from the regular license for usage rights.

Propagation of sharing rights: a DRM license for shareable content items includes the basic rules for usage of the content as well as the sharing rights. The sharing rights provided by the original author/content owner are propagated during P2P sharing and enforced during consumption of the shared content.

Content key rebinding: the content key for decrypting the content can be rebound to the recipient such that it can only be obtained under the governance of the DRM system by the recipient.

Flexibility to support many different kinds of content: embodiments of the systems and methods described herein can be used for P2P sharing of many different types of content including but not limited to audio content, video content, computer games, electronic books (e-books), ringtones, wallpaper, documents, and the like.

Flexibility to support various models of P2P sharing: embodiments of the systems and methods described herein can support various sharing models including but not limited to domain based models, subscription based models, time-limited (e.g. shared content can be consumed for a fixed number of days/fixed number of plays), and/or capability-limited models (e.g. the shared content has limitations such as limited previews for media, limited capabilities for a shared computer game, etc.).

Although the foregoing has been described in some detail for purposes of clarity, it will be apparent that certain changes and modifications may be made within the scope of the appended claims. For example, while several examples have been presented in the context of a DRM system such as that described in the '693 application, it will be appreciated that the systems and methods described herein are suitable for broader application, and can be used in the context of other types of rights management frameworks. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method comprising:
   authenticating, by a first peer, a second peer;
   obtaining, by the first peer, capability information from the second peer;
   creating, by the first peer, a list of shareable content based on the capability information obtained from the second peer and sending the list of shareable content to the second peer;
   receiving, by the first peer, a selection of a content item from the list from the second peer;
   rebinding, by the first peer, a cryptographic key associated with the content item to the second peer;
   generating, by the first peer, a sharing license for the content item;
   associating, by the first peer, the sharing license with the content item; and
   sending, by the first peer, the content item and the sharing license to the second peer.

2. The method of claim 1, wherein the capability information includes information regarding whether the second peer includes secure storage.

3. The method of claim 1, wherein the capability information includes information regarding whether the second peer supports trusted time.

4. The method of claim 1, further comprising:
   obtaining approval, from a user of the first peer, to send the content item to the second peer.

5. The method of claim 1, wherein the generating the sharing license for the content item includes evaluating an original license associated with the content item to determine if sharing is permitted.

6. The method of claim 1, wherein the authenticating the second peer includes determining whether a cryptographic certificate associated with the second peer has been revoked.

7. The method of claim 1, wherein the sharing license permits use of the content item for a limited period of time, in accordance with an original license associated with the content item.

8. The method of claim 1, wherein the sharing license permits use of the content item only if a certain node is reachable from the second peer.

9. The method of claim 1, wherein the creating the list of sharable content further comprises:
   determining at least one capability from the obtained capability information;
   determining at least one content item associated with a license specifying that the at least one capability must be satisfied in order to make use of the content item; and
   including the at least one content item on the list of sharable content.

10. The method of claim 1, wherein the obtained capability information comprises information on properties of a DRM engine associated with the second peer.

11. The method of claim 1, wherein the obtained capability information is in the form of a bit-field, each bit representing whether the second peer has a particular capability.

12. An apparatus, comprising:
    at least one processor; and
    at least one memory including computer program code, the at least one memory and the computer program code configured to, with the at least one processor, cause the apparatus to perform at least the following:
    authenticate, by a first peer, a second peer;
    obtain, by the first peer, capability information from the second peer;
    create, by the first peer, a list of shareable content based on the capability information obtained from the second peer and sending the list of shareable content to the second peer;
    receive, by the first peer, a selection of a content item from the list from the second peer;
    rebind, by the first peer, a cryptographic key associated with the content item to the second peer;
    generate, by the first peer, a sharing license for the content item;
    associate, by the first peer, the sharing license with the content item; and
    send, by the first peer, the content item and the sharing license to the second peer.

13. The apparatus of claim 12, wherein the capability information includes information regarding whether the second peer includes secure storage.

14. The apparatus of claim 12, wherein the capability information includes information regarding whether the second peer supports trusted time.

15. The apparatus of claim 12, wherein the apparatus is further configured to at least obtain approval, from a user of the first peer, to send the content item to the second peer.

16. The apparatus of claim 12, wherein the apparatus is further configured to at least evaluate an original license associated with the content item to determine if sharing is permitted.

17. The apparatus of claim 12, wherein the authenticate of the second peer includes a determination of whether a cryptographic certificate associated with the second peer has been revoked.

18. The apparatus of claim 12, wherein the sharing license permits use of the content item for a limited period of time, in accordance with an original license associated with the content item.

19. The apparatus of claim 12, wherein the sharing license permits use of the content item only if a certain node is reachable from the second peer.

20. A non-transitory computer-readable storage medium including program code, which when executed by at least one processor provides operations comprising:
    authenticating, by a first peer, a second peer;
    obtaining, by the first peer, capability information from the second peer;
    creating, by the first peer, a list of shareable content based on the capability information obtained from the second peer and sending the list of shareable content to the second peer;
    receiving, by the first peer, a selection of a content item from the list from the second peer;

rebinding, by the first peer, a cryptographic key associated with the content item to the second peer;

generating, by the first peer, a sharing license for the content item;

associating, by the first peer, the sharing license with the content item; and sending, by the first peer, the content item and the sharing license to the second peer.

* * * * *